Feb. 10, 1931.  G. P. HERRICK  1,792,014
AEROPLANE
Filed Jan. 23, 1930  6 Sheets-Sheet 1

INVENTOR
Gerard P. Herrick,
BY
Bartlett Eyre Scott & Keel
ATTORNEYS

Fig. 6

Feb. 10, 1931.　　　G. P. HERRICK　　　1,792,014
AEROPLANE
Filed Jan. 23, 1930　　　6 Sheets-Sheet 4

INVENTOR
Gerard P. Herrick,
BY
Bartlett Eyre Scott & Keel
ATTORNEYS

Feb. 10, 1931.      G. P. HERRICK      1,792,014
AEROPLANE
Filed Jan. 23, 1930      6 Sheets-Sheet 5

INVENTOR
Gerard P. Herrick,
BY
Bartlett Eyre Scott & Keel
ATTORNEYS

Patented Feb. 10, 1931

1,792,014

UNITED STATES PATENT OFFICE

GERARD P. HERRICK, OF NEW YORK, N. Y.

AEROPLANE

Application filed January 23, 1930. Serial No. 422,715.

This invention relates to aeroplanes.

The object of the invention generally is an aeroplane constructed and operating normally as a conventional power driven gliding aeroplane and possessing the desirable qualities of speed, maneuverability, efficiency in operation and general all round performance of that type but capable of ready and instant conversion while in the air to a craft having the combined characteristics of both the fixed wing aeroplane and wind driven sustaining propeller or rotating wing types for effecting a safe directed and controlled aligning in restricted spaces or in emergencies as, for example, upon a complete failure of the power plant. Because of its combined characteristics the craft of my invention may be appropriately termed a rotor landing wing aeroplane so called because it is essentially an aeroplane which can alight anywhere safely by means of a wind driven rotating wing acting as a sustaining propeller.

Aircraft operating on the helicopter principle have been proposed with sustaining propellers disposed in substantially horizontal planes and positively driven by the power plant, but such craft for well known reasons have so far proven impractical.
Craft with freely rotative (but non-convertible) wing planes have been proposed wherein the relative air flown across the planes in flight is utilized for rotating them, but these in common with all continuously rotating wing plane craft lack the responsive control, speed, maneuverability, efficiency in operation and general all round performance of the conventional aeroplane. Convertible craft have been proposed wherein oppositely auto-rotating wings and helicopter wings may be arrested while in the air and caused to act as fixed wings but in all such craft either the fixed wing characteristics and qualities, structural and operating, or the rotating wing and conversion qualities, or both, have proven unsatisfactory. By my invention I obtain in a specially satisfactory manner the superior advantages of the conventional aeroplane structure for ordinary and normal flying and in addition the desirable safe landing or parachute qualities of a craft of the wind driven sustaining propeller or windmill type. To this end I construct my craft as a conventional fixed wing aeroplane for normal flight and construct one of the planes of the craft with a symmetrical profile having good fixed wing characteristics both structural and aerodynamic but mounted so as to be capable of being readily converted by the pilot from a conventional fixed wing to a wing efficiently functioning as a wind driven rotating wing or sustaining propeller of zero degrees uniform pitch angle for enabling the craft to effect a safe emergency alighting or deliberate landing in restricted places under all conditions of operation. The convertible wing is provided with a special mounting permitting rotation thereof as a wind driven sustaining propeller while acting as a rotor landing wing and at the same time enabling it to have free movement relative to the craft about an axis arranged at right angles to the axis of rotation under the influence of gyroscopic and other forces creating moments thereabout and thereby rendering the aeroplane control less affected by the rotation of the wing while acting as a sustaining propeller, while means are devised for normally retaining the rotatable wing in rigid fixed position against both of these movements for operation as a conventional fixed wing together with means for readily and quickly releasing these retaining means at the will of the operator while in the air. The invention also includes in the preferred form means for quickly starting the rotatable wing which may comprise any one of several different means for effecting this purpose to be hereinafter described. The rotatable wing utilized in the craft is preferably of a special reversible symmetrical profile form, to be described, adapting it to efficient operation both as a conventional aeroplane fixed wing and a rotating sustaining propeller, though certain features of the invention are independent of any particular form of wing.

For a better understanding of the invention reference may be had to the accompanying drawings wherein:

Figure 1A:
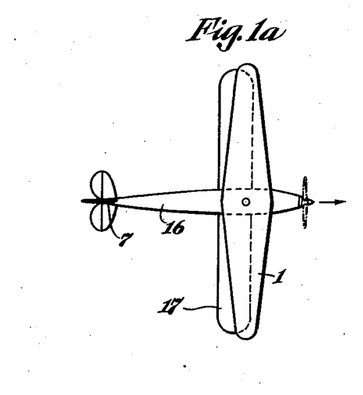
Figs. 1a, 1b and 1c are general views of an aeroplane embodying the invention showing the method of operation.
Figure 1B:
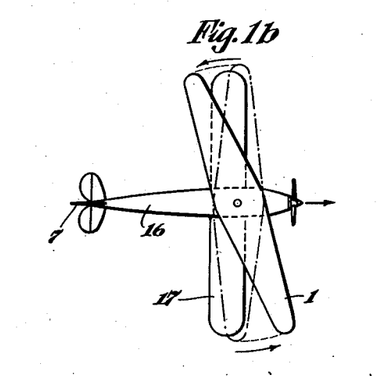
Figure 1C:
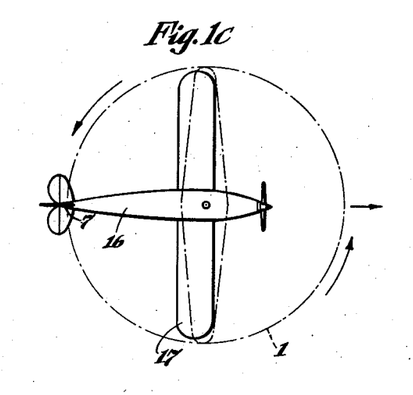

In Figs. 1a, 1b and 1c I have indicated diagrammatically an aeroplane of the bi-plane type embodying my invention and showing the method of operation. Fig. 1a indicates the ascension and normal flight of the craft, this being according to standard conventional aeroplane practice. Fig. 1b indicates the plane in the air with the power plant dead and the pilot just on the point of effecting a safe steep or emergency landing by converting the craft into the rotor landing wing aeroplane of my invention. Here the pilot has released the wing 1 for rotation as a sustaining propeller and has also released the retaining means thereby permitting the limited relative movements of the wing and the craft, the wing just beginning to rotate as a sustaining propeller about its axis of rotation in response to the action of the starting means. Fig. 1c indicates the wing 1 rotating as a sustaining propeller or windmill during the safe descent and landing, the pilot being able to effect a slow but steep descent and to control and direct the downward descent of the craft notwithstanding the complete failure of the power plant and notwithstanding the limited space which may be provided for landing.

Figures 2, 3:
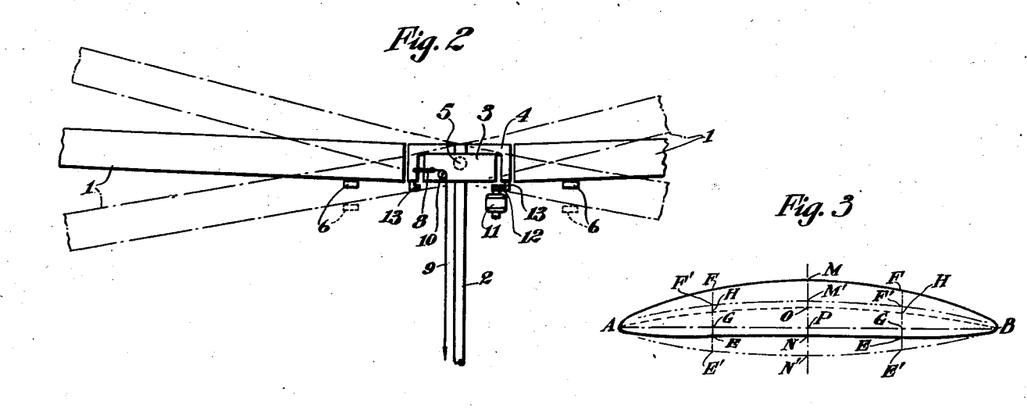
Fig. 2 is a diagrammatic view of certain of the mechanisms of the aeroplane.
Fig. 3 is a profile of the rotatable wing section.

In Fig. 2 I have indicated diagrammatically the wing 1 mounted for permissible rotation about a vertical standard 2, a bearing unit 3, 4 being diagrammatically illustrated to effect this purpose, 3 being the stationary element and 4 being the element which rotates with the wing. I have indicated the rotatable wing 1 as mounted by means of pivot joints 5 upon the bearing element 4 to provide free relative pivoting movements between the wing, while rotating as a sustaining propeller, and the craft, the pins 5 forming an axis at right angles to the axis of rotation, with the above indicated advantages.

I have also indicated diagrammatically at 6 a means for retaining the wing 1 and the craft against these relative free pivoting movements, these means 6 being readily releasable by the pilot and in the released position indicated in dotted lines functioning to limit the angular adjustments of the plane 1. This means may be any suitable device for that purpose, as for example it may be in the form of a ring carried by any stationary part of the craft and movable upwardly to engage the under surface of the wing to retain or hold it firmly against the angular adjustments. I have also diagrammatically indicated a means for retaining the plane against rotation, this means, in the particular form indicated, being a locking pin 8 which in the held position occupies registering recesses in the two bearing members 3 and 4. It is capable of ready removal from the held position as, for example, by means of a chain or cable 9 passing over pulley 10. Any suitable means may be devised for initially starting the rotation of the wing. I have indicated diagrammatically such means at 11. This may, for example, be an electric motor which is run from a battery and is geared to the wing by the gears 12 and 13 the latter being indicated as carried by the bearing member 4, or it may be an inertia starter of standard form, electrically or hand driven. The starting means may be of just sufficient capacity to initiate the rotation of the wing which is thereafter rotated as a wind driven sustaining propeller and may be any of the several types to be hereinafter disclosed. Where it comprises an electric motor or an inertia starter or equivalent apparatus, an overrunning clutch or equivalent device may be provided for disconnecting the motor from the wing when the latter gets up to speed as a wind driven sustaining propeller. The pilot in an emergency may very quickly release the wing for rotation and relative pivoting movements and initiate the starting means whereupon the craft is converted into the rotor landing wing aeroplane indicated in Fig. 1c. The wing 1 has a profile form symmetrical about the line perpendicular to the middle of the chord particularly adapting it to functioning efficiently as a combined fixed conventional aeroplane wing and wind driven sustaining propeller. Its profile is indicated in Fig. 3, and, while certain features of the invention are not restricted to any particular profile or symmetrical wing, nevertheless I have found that this profile, as indicated in Fig. 3, has an aerodynamic efficiency as a gliding or aeroplane wing approaching that of many of the conventional unidirectional unsymmetrical aerofoil sections in use while its symmetrical character together with its aerodynamic performance render it particularly suitable as a wind driven sustaining propeller. This profile has a thickness at any point equal to $$\frac{a}{c}\sqrt{c^2 - 4x^2}$$

where $a$ is the maximum thickness MN of the profile, namely at the center of the chord, $c$ is the length of the chord APB and $x$ is the distance along the chord from the center point P thereof. The cambers of the upper and lower surfaces are determined by the mean camber line AOB. The latter is an arc or section of a mathematical curve symmetrical about the line MN of the profile. This arc, for example, may be of any conic section curve, as for instance an ellipse, a circle, a hyperbola or a parabola. A very satisfactory method of deriving the symmetrical profile or contour of the convertible wing is to distort an ellipse whose original major axis is the chord of the profile and whose minor axis is the maximum thickness of the profile the distortion being in accordance with a section or arc of a mathematical curve which arc is symmetrical with respect to the line perpendicular to the middle of the chord and forms the mean camber line of the profile thus obtained.

Referring to Fig. 3 I have indicated an ellipse in dot and dash lines AM' BN', APB being the major axis and M'N' being the minor axis, while APB forms the chord of the profile and M'N' is the maximum thickness of the profile. The maximum ordinate of mean camber OP having been given point O is obtained on the minor axis of the ellipse and the arc of the desired curve is drawn through AOB, this arc to be the mean camber of the profile. As indicated above in the particular embodiment shown the arc AOB is the arc of a circle and the profile is obtained by distorting the ellipse in accordance therewith as indicated, the ordinates of the ellipse being moved or displaced perpendicularly to the chord to effect this result, the minor axis M'N' becoming now the maximum thickness MN of the profile and the thickness E'F' of the ellipse now becoming the thickness EF of the profile at that point on the chord. The thickness of the profile at any point on the chord is equal to the thickness of the ellipse at that same point. We have, therefore, taking any point on the chord, as for example the ordinate GF' of the ellipse FH=HE=GF'=GE'. The aerofoil is more particularly set forth in my application entitled Aerofoils, filed on even date herewith. The symmetrical wing may be tapered, double trapezoid or any other suitable form and may have a uniform profile form throughout, or the profile may vary from point to point along the span, but preferably the profile form is uniform throughout the wing.

The wing is preferably tapered in plan as shown in Figs. 1a and 1b, and in the embodiment thereof the profile form is proportionally uniform from root to beginning of tip, the chord lengths being varied to obtain the desired taper. The wing may also be tapered in thickness with the profile form varying from point to point along the span.

Figures 4, 5:
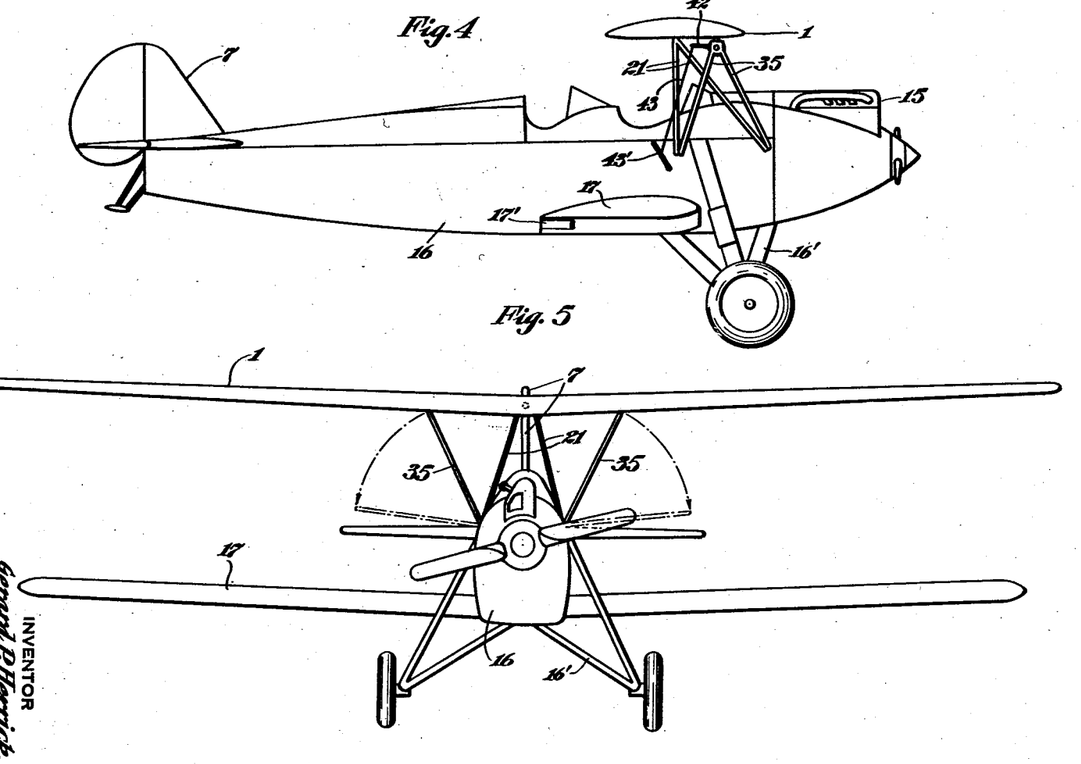
Fig. 4 is a side view of an aeroplane embodying the invention.
Fig. 5 is a front view thereof.
Figure 6:
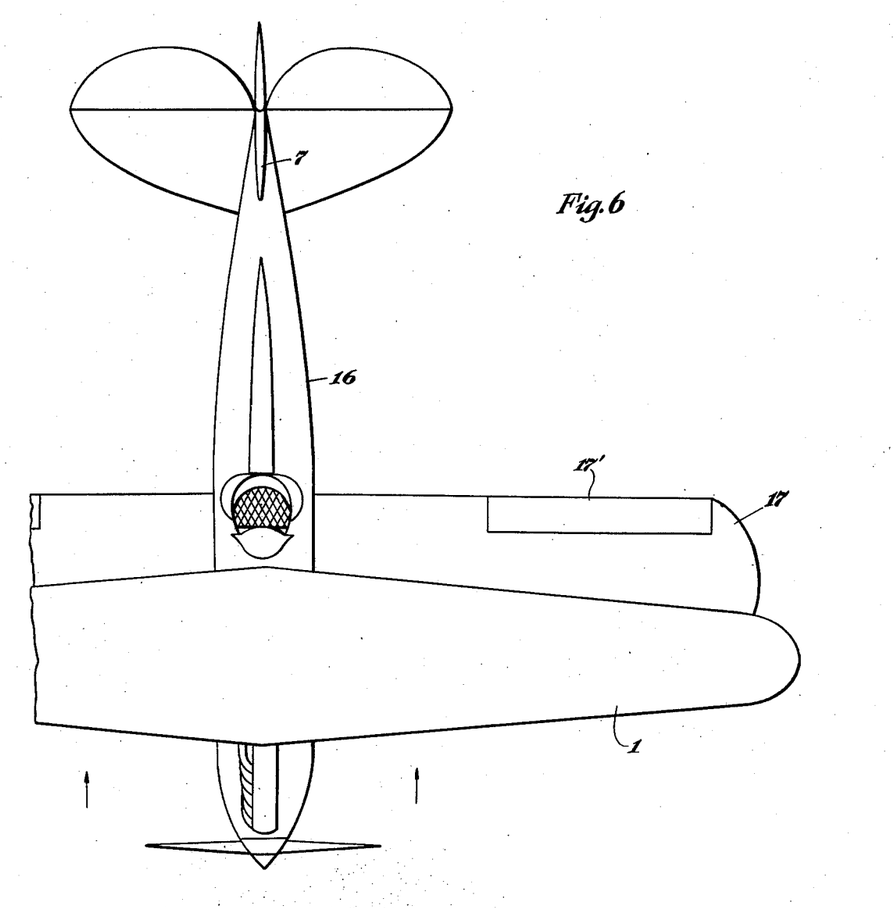
Fig. 6 is a plan view thereof.
Figure 7:
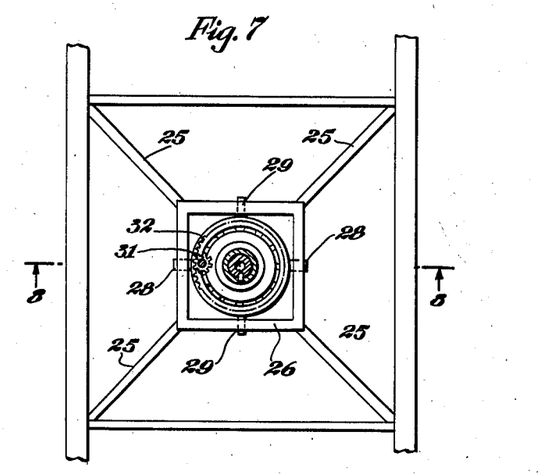
Figs. 7, 8 and 9 are views somewhat diagrammatic of the reversible wing mounting and starting means.
Figure 8:
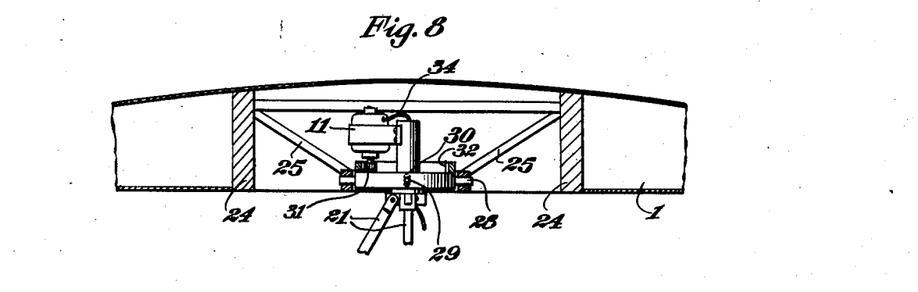
Figure 9:
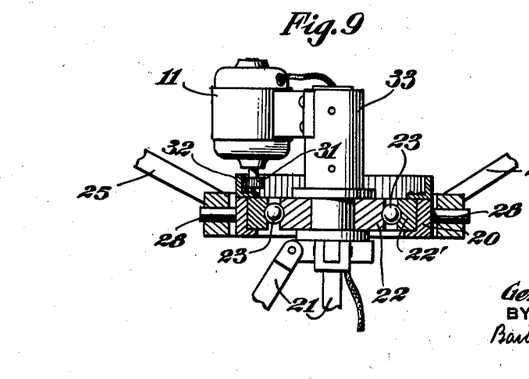
Figure 10:
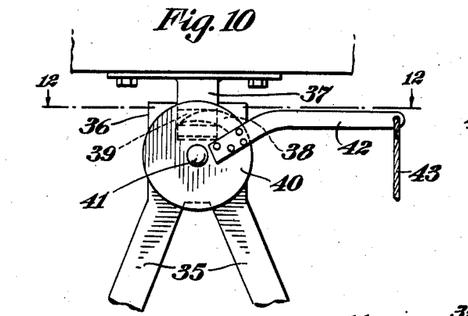
Figs. 10, 11 and 12 are views somewhat diagrammatic of the means for retaining the reversible wing in fixed position and releasing means.
Figure 11:
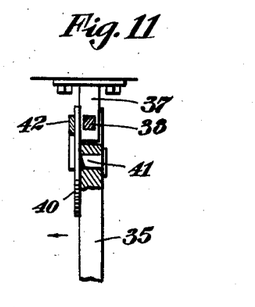
Figure 12:
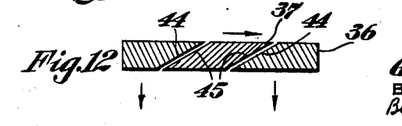

In Figs. 4, 5 and 6 I have indicated my invention as embodied in a biplane, the main power plant of the craft being indicated at 15 in the nose of the fuselage 16, the tail control unit being indicated at 7, the ailerons at 17' and the landing gear at 16'. The lower wing 17 is fixed at all times while the upper wing 1 is mounted and constructed for operation either as a conventional aeroplane wing, or as a wind driven sustaining propeller. Means are provided for permitting both rotation and automatic relative pivoting movements of the wing and the craft, together with means for the ready conversion of the plane while in the air from the conventional aeroplane to rotor landing wing aeroplane. In the particular embodiment illustrated in these figures the upper and lower planes have a large stagger, and both of them have a slight positive dihedral, but, of course, the relative arrangements of the fixed and rotatable wings may be modified to suit different requirements. In Figs. 7, 8 and 9 I have indicated, somewhat diagrammatically, a means for mounting the upper reversible wing 1 for ready operation as a wind driven sustaining propeller, as described generally in Figs. 1a, 1b and 1c. The wing is carried by a stationary bearing member 22, the latter being carried by a standard on the fuselage consisting of the four upwardly converging struts 21. The wing 1 is rotatably supported by the bearing member 22 through the intermediary of a co-operating bearing member 22', the latter being adapted to rotate freely about the bearing member 22, and preferably the journal includes ball bearings 23 or the like for minimizing friction. The wing 1 is mounted upon the rotating member 22' in any suitable manner, as for example upon the frame member 20, so as to provide for relative pivoting movements in vertical planes or in the plane of the axis of rotation of the rotating bearing member 22'. To this end the wing framework, as for example the wing beams 24, are provided with downwardly extending and converging struts or bars 25, the latter converging to and supporting a rectangular frame member 26, which surrounds the bearing member 20 and is connected thereto by means of the pin joints 28, permitting the pivoting of the wing 1 about the frame member 20 on an axis at right angles to the axis of rotation. I have indicated at 29 a means such, for example, as stop fingers for limiting the pivoting movements of the plane 1, to avoid interference with tail surfaces, propeller, etc. the means 29 being carried by a stationary part of the frame, and engaging the opposite members of the rectangular frame 26 when the latter pivots through predetermined limits. For example, these stop fingers 29 are indicated as passing through slots 30 formed in the frame members 26, and as permitting the limited pivoting of the wing. I have also indicated an electric motor 11 for initiating the operation of the wind driven sustaining propeller 1, this being either in the form of an electric motor directly geared to the rotating frame member 20 by means of the gear members 31 and 32, the latter being in the form of an internal sleeve gear carried by the rotating frame member 20, or in the form of an inertia starter of conventional form where the gear member 31 is operated by an inertia starter including a fly-wheel with the electric motor being utilized for driving the fly-wheel up to speed. This starting unit 11 is indicated as mounted within the wing 1 and supported from a member 33 which is carried above the stationary bearing 22. Electrical connections 34 are indicated as leading up through the stationary structure to the electric motor. It is understood, of course, that the journals 22' and 22 are of such character as to transmit the lifting load of the rotating wing to the craft while the wing 1 is operating as a sustaining propeller, the details of construction being omitted for convenience in illustration. The means for holding the wing 1 in position as a conventional aeroplane wing comprises a pair of upwardly converging struts 35 carried by either side of the fuselage 16, the pairs of struts diverging from each other as indicated in Fig. 5. Both of these sets of struts 35 are releasably attached to the rotatable wing 1 at points removed from the central journal structure, and are hingedly attached to the fuselage to swing outwardly when they are released as indicated in dotted lines in Fig. 5, the hinge connections of the struts to the fuselage being omitted for convenience in illustration. The struts 35 of a pair are preferably rigidly joined to each other at their upper ends to form a connecting member 36 which co-operates with a corresponding attaching member 37 depending downwardly from the wing (Figs. 10–12). The member 36 is provided with a slot to accommodate the member 37, and the two are firmly held together by means of a cam member 38 which is pivotally carried by the member 36 and enters a cam slot or recess 39 formed in the member 37. In the particular embodiment shown, the cam 38 is carried by a disc 40 which is pivoted at 41 to the member 36, and is provided with an operating lever 42, together with any suitable means such as a cable 43 for releasing the cam 38 from a distant point. The slot formed in the member 36 for accommodating the downwardly depending lug 37 is provided with inclined cam surfaces 44 and the member 37 is provided with side surfaces 45 conforming to the incline of the cam surfaces 44, whereby upon release of the holding cam 38, and upon the starting of the rotation of the wing, as indicated by the upper arrow in Fig. 12, the member 36 and the struts 35 are automatically actuated in the direction of the arrow beneath the figure to cause the struts to move out of a fouling position to permit the rotation of the wing unhindered thereby, the struts taking up a position as indicated in dotted position in Fig. 5. It is only necessary for the pilot to pull the lever 43' actuating both cables 43 in order to release the wing both for rotation in horizontal planes and for the limited pivoting movement in vertical planes described above. After the craft has effected a safety and emergency landing the wing may again be fastened in position while on the ground to function as a conventional aeroplane wing by first bringing the wing and the strut members 36 and 37 into fastening position, and then operating the levers 42 to fasten the parts together.

Figure 13:
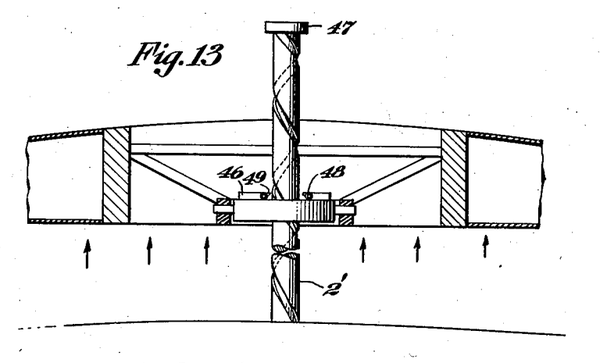
Figs. 13, and 14 are views of a modified starting arrangement.
Figure 14:
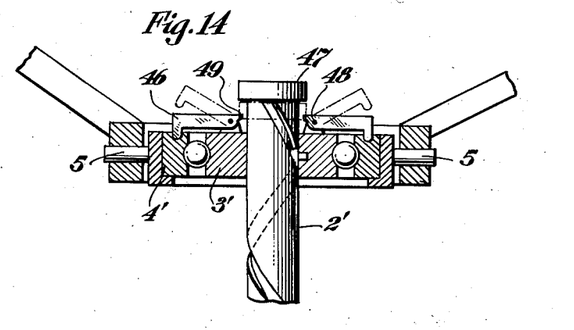
Figure 15:
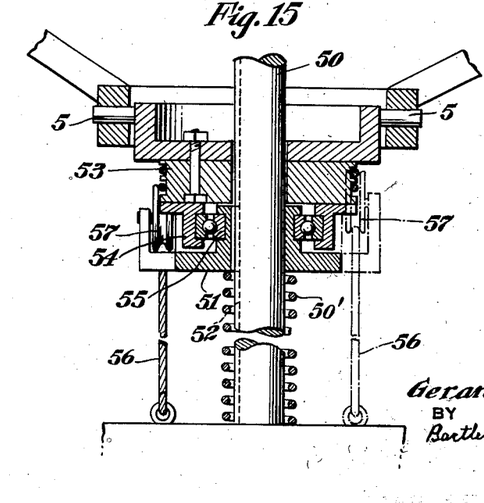
Figs. 15, 16, 17 and 18 are views of a modified starting arrangement.
Figure 16:
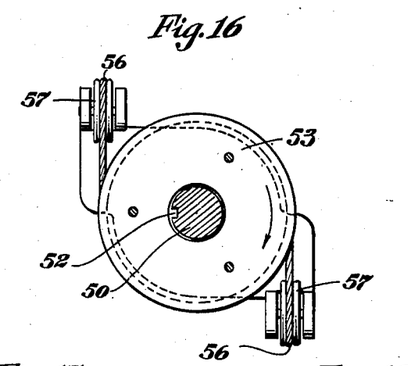
Figure 17:
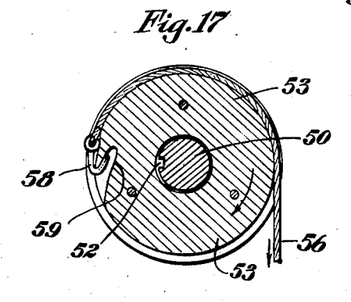

In Figs. 13 and 14 I have indicated a modified means for initiating the rotation of the wing, this means being diagrammatically illustrated for convenience. Here the aerodynamic lift upon the rotatable wing is utilized for starting the rotation of the wing as a windmill. To this end I have formed the upper end of the vertical standard 2' with an external screw-thread co-operating with a small internal thread formed on the inner bearing member 3', and have provided means such as pivoted latches 46 for holding the inner and outer bearing members 3' and 4' rigidly together at the beginning of the rotary upward movement. At the upper end of the standard 2' is provided a circular flange or shoulder 47 for arresting the upward movement of the bearings, and for automatically releasing the latches 46 to permit the continued rotation of the wing and bearings 4' about the inner bearings 3'. For this purpose the latches 46 are pivoted at 48 to lugs formed on the inner bearing members 3' and are provided with heels 49 for engagement by the flange 47 in the extreme upward position of the bearings. The wing is mounted by means of the pin joints 5 upon the outer bearing members 4' and any suitable means such as that, for example, shown in Fig. 5 or in Figs. 7, 8 and 9, may be provided for limiting the relative pivoting movement of the wing about these pin joints. In the operation of this form of the invention the pilot or operator releases the struts 35, as indicated in Figs. 10, 11 and 12, thereby permitting both the rotary and upward movement of the wing, whereupon the aerodynamic lift upon the rotatable wing causes it to move upwardly relatively to the fuselage, and in doing so, it is given an initial rotary movement by means of the screw shaft 2' and bearing arrangement indicated. While I have indicated means for positively rotating the wing through at least three revolutions, ordinarily in practice it will be sufficient to give it much less in order to effect the starting of the operation of the wing as a wind driven sustaining propeller.

Figure 18:
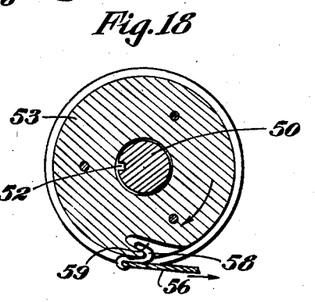

In Figs. 15, 16, 17 and 18 I have indicated a cable and pulley arrangement in the place of the screw arrangement of Figs. 13 and 14 for effecting the starting of the rotation of the wing by the aerodynamic lift thereupon. Here the standard 50 is fixed and the bearing structure 51 is keyed at 52 thereto for up and down sliding movements thereupon. The wing is mounted on pin joints 5 similarly as described above for limiting pivoting movements, but hereupon a windlass 53, which is rotatably journaled upon the standard 50, the windlass 53 carrying underneath thereof an outer bearing member 54 co-operatively functioning with the inner relatively fixed bearing member 55. The windlass 53 is attached to a stationary part of the craft, as for example the fuselage structure, by means of one or more cables 56, there being two of such cables illustrated in the drawings. These cables pass over pulleys 57 which are carried by brackets supported by the sliding bearing structure 51. From the pulleys 57 the cables are wound around the windlass 53 and are attached thereto in such manner as to impart a rotary movement to the windlass and the rotatable wing when the wing together with the bearing structure 51 is caused to move upwardly upon the standard 50 through the action of the aerodynamic lift upon the wing, it being understood that the bearing structure 51 and windlass 53 are fixed together for reciprocating movements upon the standard 50, but that the windlass 53 is capable of rotation relatively to the bearing structure 51. Any suitable means may be provided for disconnecting the cable 56 or the windlass 53 from the wing to permit the continued rotation thereof as a windmill after the wing and the windlass complete the upward reciprocating movement upon the standard 50. I have indicated such means in Figs. 17 and 18 as comprising a hook 58 fastened to the end of a cable 56, and entering a groove or recess 59 formed in the windlass 53. When the windlass reaches the end of the positive drive and is continued by operation of the wing as a sustaining propeller the hooks 58 are automatically released from the recesses or grooves 59 as indicated in Fig. 18, permitting the continued unhindered operation of the rotating wing as a sustaining propeller. At 50' I have indicated a spring surrounding the standard 50 and disposed between the main support and the member 51 for assisting in lifting the wing and starting the same in rotation.

While ordinarily I rely altogether on the mechanical or electro-mechanical means shown for initiating the rotation of the convertible and reversible wing as a sustaining propeller, I may assist such starting means by changing the aerodynamic characteristics of the wing on one side of the fuselage or the other or on both in a manner to impart a rotating moment to the wing as, for example, by providing one or both sides of the wing with deformable or adjustable parts for differentially varying the drag on the two sides, the means for actuating the deformable part or parts of the wing being of a character to permit the continued rotation of the wing as a sustaining propeller. Such means may also be utilized for assisting in counteracting the undesirable moments and forces set up in the wing while rotating. In some cases I may desire also to use rockets or similar devices disposed in the trailing sides of the wing for assisting in the initiation or iniating the starting of the rotation thereof as a sustaining propeller. While I have shown my invention as applied to a self propelled aeroplane it is understood that certain features of the invention are equally applicable to gliders or aeroplanes operating as gliders or which are towed.

I claim:

1. In an aeroplane a normally fixed supporting wing having a mounting permitting rotation thereof in substantially horizontal planes as a wind driven sustaining propeller and pivoting movements relative to the axis of rotation, retaining means for holding the wing in fixed position against rotation, retaining means for holding the same in the fixed position against relative pivoting movements, means for releasing both of said retaining means at the will of the pilot, and a means for driving the aeroplane through the air.

2. In an aeroplane a fixed supporting wing system including a pair of wings, means for driving the craft through the air, one of said wings having a mounting permitting rotation thereof in substantially horizontal planes as a wind driven sustaining propeller and limited pivoting movements relative to the axis of rotation, retaining means for retaining the wing against rotation, retaining means for holding the same against the relative pivoting movements, and means for releasing both of said retaining means at the will of the pilot.

3. In an aeroplane a fixed supporting wing system including a pair of wings, means for driving the craft through the air, one of said wings having a mounting permitting rotation thereof in substantialy horizontal planes as a wind driven sustaining propeller and limited pivoting movements relative to the axis of rotation, retaining means for holding the rotatable wing against rotation, retaining means for holding the same against the relative pivoting movements, means for releasing both of said retaining means at the will of the pilot, and means independent of the driving means for initiating the rotation of the rotatable wing while in the air.

4. In an aeroplane a fixed supporting wing system including a pair of wings, means for driving the craft through the air, one of said wings having a symmetrical profile and having a mounting permitting rotation thereof in substantially horizontal planes as a wind driven sustaining propeller and limited pivoting movements relative to the axis of rotation, retaining means for holding the symmetrical profile wing against rotation, retaining means for holding the same against the relative pivoting movements, and means for releasing both of said retaining means at the will of the pilot.

5. In an aeroplane a fixed supporting wing system including a pair of wings, means for driving the craft through the air, one of said wings having a symmetrical profile and having a mounting permitting rotation thereof in substantially horizontal planes as a wind driven sustaining propeller and limited pivoting movements relative to the axis of rotation, retaining means for holding the symmetrical profile wing against rotation, retaining means for holding the same against the relative pivoting movements, means for releasing both of said retaining means at the will of the pilot, and means independent of the driving means for initiating the rotation of the symmetrical profile wing while in the air.

6. In an aeroplane of the character set forth in claim 1 wherein means independent of the driving means is provided for initiating the rotation of the wing while in the air.

7. In an aeroplane of the character set forth in claim 1 wherein the wing has zero uniform pitch angle.

8. In an aeroplane of the character set forth in claim 1 wherein the wing pivots at an angle to the axis of rotation.

9. In an aeroplane of the character set forth in claim 1 wherein the wing pivots at right angles to the axis of rotation.

10. In an aeroplane a fixed supporting aerofoil system including a pair of wings, a prime mover for driving the craft through the air, one of said wings being of symmetrical profile and convertible and having a mounting permitting rotation thereof in substantially horizontal planes as a wind driven sustaining propeller, and pivotal movement in substantially vertical planes, the other of said wings being fixed at all times, and a prime mover independent of the first named prime mover for initiating the rotation of said convertible wing while in the air.

11. In an aeroplane of the character set forth in claim 1 wherein the wing is of symmetrical profile and has a thickness at any point equal to $$\frac{a}{c}\sqrt{c^2-4x^2}$$

where $a$ is the maximum thickness of the profile, $c$ is the chord length and $x$ is the distance along the chord from the central point thereof, the curvatures being determined by the maximum ordinate of mean camber and the mean camber line, the latter being the arc of a mathematical curve.

12. An aeroplane including a wing mounted to operate as a rotating wing, said wing being of a profile symmetrical about the line perpendicular to the middle of the chord and having a thickness at any point equal to $$\frac{a}{c}\sqrt{c^2-4x^2}$$

where $a$ is the maximum thickness of the profile, $c$ is the chord length and $x$ is the distance along the chord from the central point thereof, the curvatures being determined by the maximum ordinate of mean camber and the mean camber line, the latter being the arc of a mathematical curve.

13. In an aeroplane the combination of a convertible supporting wing of symmetrical profile mounted for operation either as a fixed gliding wing or as a rotating wing pivoting in a vertical plane and a prime mover for driving the craft through the air, with an independent prime mover for initiating the rotation of said wing while in the air.

14. An aeroplane of the character set forth in claim 13 wherein the independent prime mover comprises an electric motor suitably geared to the convertible wing.

15. In an aeroplane the combination of a convertible supporting wing mounted for operation either as a fixed gliding wing or as a rotating wing with means for initiating the rotation of said wing operable by the aerodynamic reaction thereon.

16. In an aeroplane of the character set forth in claim 15 wherein the convertible wing in addition to being mounted for rotation is also mounted for movement relative to the craft frame in response to the aerodynamic reaction, with means responsive to said movement for rotating the wing.

17. In an aeroplane of the character set forth in claim 15 wherein the convertible wing in addition to being mounted for rotation is also mounted for movement relative to the craft frame in response to the aerodynamic reaction, with means responsive to said movement for rotating the wing including a spiral drive connection between the wing and its support.

18. In an aeroplane of the character set forth in claim 15 wherein the convertible wing in addition to being mounted for rotation is also mounted for movement relative to the craft frame in response to the aerodynamic reaction, with means responsive to said movement for rotating the wing including a spiral drive connection between the wing and its support together with means for releasing the drive connection at a predetermined point in upward travel of the wing.

19. In an aeroplane of the character set forth in claim 15 wherein the convertible wing in addition to being mounted for rotation is also mounted for movement relative to the craft frame in response to the aerodynamic reaction, with means responsive to said movement for rotating the wing including a windlass drive connection between the rotatable wing and the craft frame.

20. In an aeroplane of the character set forth in claim 15 wherein the convertible wing in addition to being mounted for rotation is also mounted for movement relative to the craft frame in response to the aerodynamic reaction, with means responsive to said movement for rotating the wing including a windlass drive connection between the rotatable wing and the craft frame together with means for releasing the windlass drive at a predetermined point of the upward travel of the wing.

21. In an aeroplane the combination of a convertible supporting wing mounted for operation either as a fixed gliding wing or as a rotating wing with means for initiating the rotation of said wing operable by the relative movement of the wing and its support including means for imparting to said wing said movement.

22. In an aeroplane of the character set forth in claim 21 wherein the means for imparting relative movement to the wing includes a spring or its equivalent.

23. In an aeroplane of the character set forth in claim 21 wherein the means for imparting relative movement to the wing is responsive to aerodynamic lift assisted by a spring or its equivalent.

24. In an aeroplane a normally fixed supporting wing of symmetrical profile having a mounting permitting rotation thereof in substantially horizontal planes as a wind driven sustaining propeller and pivoting movements relative to the axis of rotation, means for retaining the wing in fixed position against rotation and against relative pivoting movements and releasing the same and a means for driving the aeroplane through the air.

25. In an aeroplane a normally fixed supporting wing of symmetrical profile having a mounting permitting rotation thereof in substantially horizontal planes as a wind driven sustaining propeller and pivoting movements relative to the axis of rotation, and means for retaining the wing in fixed position against rotation and against the relative pivoting movements and releasing the same to permit the rotation and pivoting thereof.

In testimony whereof, I have signed my name to this specification.

GERARD P. HERRICK.